June 25, 1946.  F. M. CLARK  2,402,872
HALOGENATED NITRONAPHTHALENE COMPOSITIONS
Filed Nov. 23, 1943
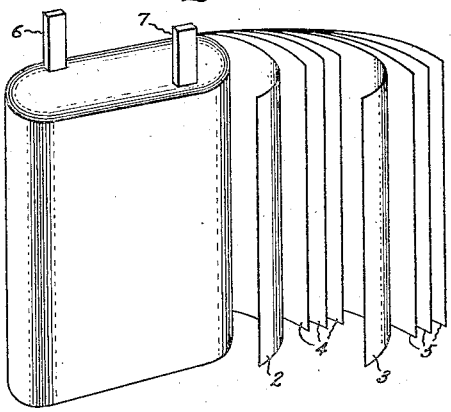
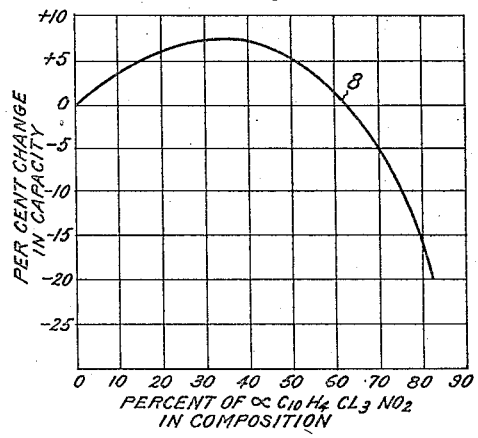
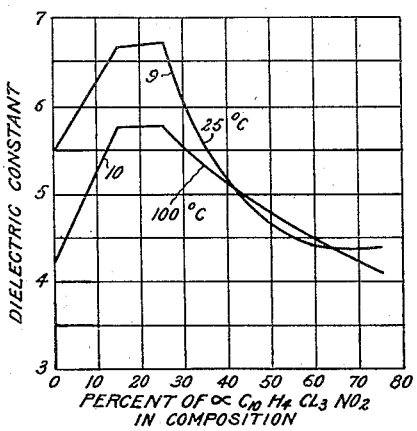
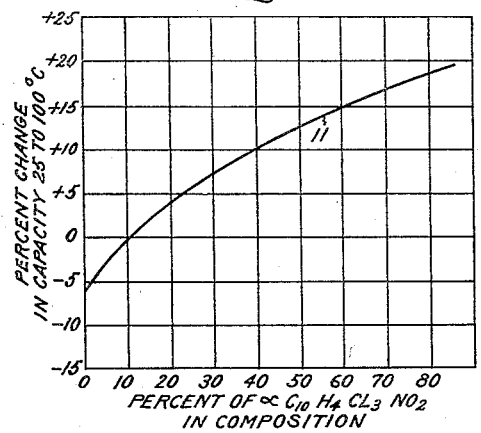
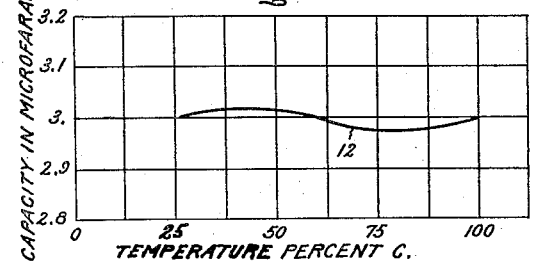
Inventor:
Frank M. Clark,
by Harry E. Dunham
His Attorney.

Patented June 25, 1946

2,402,872

UNITED STATES PATENT OFFICE 2,402,872

HALOGENATED NITRONAPHTHALENE COMPOSITIONS

Frank M. Clark, Pittsfield, Mass., assignor to General Electric Company, a corporation of New York Application November 23, 1943, Serial No. 511,440

8 Claims. (Cl. 252—66)

The present application relates to chlorinated nitronaphthalene compositions and is a continuation-in-part of my earlier application Serial No. 466,021, filed November 18, 1942, which in turn is a continuation of application Serial No. 355,588, filed September 6, 1940.

It comprises new compositions suitable for dielectric and insulating purposes in electric capacitors, capacitance bushings, or other electric devices, and in particular compositions consisting wholly or in part of trichlor alpha nitronaphthalene. My invention also includes compositions in which chlorinated nitronaphthalene is associated with halogenated polyphenyl products as, for example, pentachlor diphenyl.

In the accompanying drawing Fig. 1 is a paper-spaced capacitor, shown partly unrolled, as an example of a device for the impregnation of which compositions embodying the present invention are suitable; Fig. 2 is a graph showing the relation of capacity to a range of compositions containing trichlor alpha nitronaphthalene; Fig. 3 is a graph showing the dielectric constants for a range of compositions made up of pentachlor diphenyl and trichlor alpha nitronaphthalene; Fig. 4 is a graph showing the relation of capacity to temperature for a range of compositions embodying my invention; and Fig. 5 is a graph showing the relation to capacity to temperature for a specific composition made in accordance with my invention.

Capacitors ordinarily contain sheet material spacers or septa between metal armatures, as for example capacitor linen or kraft paper. Capacitor spacers also may consist of derivatives of cellulose, such as sheets or tapes of cellulose acetate, Cellophane or cellulose ethers, as for example ethyl cellulose and its modifications. When coated or impregnated with my new compositions, such spacers show surprisingly good dielectric stability.

Chlorinated nitronaphthalenes like all nitro compounds, are not characterized by a high degree of chemical stability. When subjected to heat in the range of from 75 to 100 C. or to light, even at room temperature, these compounds deteriorate chemically. They darken in color and increase in acidity and otherwise show a chemical change which normally would be expected to result in a high degree of electrical instability in any dielectric assembly of which they might be a part. Surprisingly, the contrary has been found to be true. Electrical apparatus when impregnated with my improved dielectric compositions is characterized by a high degree of electrical stability and otherwise is well suited for practical use. Trichlor alpha nitro naphthalene, in particular, has been found to possess the best combination of properties whereby desirable characteristics are imparted to capacitors and other electric devices, as, high efficiency, long life and desirable temperature-capacity characteristics.

In preferred compositions embodying my invention trichlor alpha nitronaphthalene constitutes at least about 10 per cent and up to about 40 per cent of the entire composition. However, for some purposes the content of such chlorinated alpha nitronaphthalene may be as high as 60 per cent and in other cases may be as low as a fraction of one per cent.

Compositions consisting mainly of mixtures of blends comprising about 80 to 90 per cent of chlorinated diphenyl and about 20 to 10 per cent of trichlor alpha nitronaphthalene have the unique property of operating with substantially constant capacity over the range of temperatures at which capacitors ordinarily operate, that is, from 25 to 100° C. or thereabouts, these limits being only approximate.

Alpha nitronaphthalene may be chlorinated by methods usually employed for the chlorination of aromatic compounds. Preferably a suitable catalyst should be present, for example, iron, antimony, iodine or aluminum. Chlorination is continued until the amount of combined chlorine as determined by the specific gravity or the weight of a sample of the product has reached a value corresponding to a desired chlorination product.

For example, trichlor alpha nitronaphthalene may be prepared by the following procedure:

To 1780 parts by weight of alpha nitronaphthalene is added a suitable catalyst, such for example as about 5 parts of comminuted iron. The mixture is heated to produce fusion which takes place at a temperature of about 60 to 70° C. chlorine gas is bubbled through the fused mass. The temperature should be raised as chlorination proceeds. The following schedule is a general guide.

When the increase in weight of the product indicates that the chlorination has progressed to about one to two atoms per molecule (about 22 per cent chlorine), the chlorination is somewhat slowed. In order to accelerate the reaction the temperature is raised to about 70 to 90° C. When the total combined chlorine corresponds to about 2.5 atoms per molecule (about 34 per cent chlorine), the reaction temperature should be raised to about 90 to 110° C. It is maintained in this range until the increase in weight indicates about 38 per cent chlorine in combination. This is the theoretical amount of chlorine present in trichlor alpha nitronaphthalene.

The chlorination then is discontinued. The reaction mass is cooled and dissolved in a suitable solvent as, for example, carbon tetrachloride. The iron particles are removed by filtration. The solution is washed with an alkali, for example, a one per cent aqueous solution of sodium carbonate. The neutralized solution is concentrated by evaporation until crystals of trichlor alpha nitronaphthalene separate therefrom. These crystals are removed by filtration, or other convenient way, and dried in air or under vacuum or other known method. The crystalline product at this stage has a melting point of about 132 to 135° C. It is suitable without further purification for many electrical uses. For some purposes a more highly purified product may be desirable. This can be obtained by recrystallization. The melting point of the pure product is about 155° C.

Alternatively, the chlorination may proceed in the presence of an iron catalyzer until approximately 38 per cent of chlorine has been introduced. At this stage most of the product will consist of trichlor alpha nitronaphthalene. Some tetrachlor and some dichlor alpha nitronaphthalene may be present in the chlorination product. The mixture may be purified by distillation. It has a boiling point in the range of 230 to 280° C. at a pressure of 15 millimeters of mercury. The yield obtained is about 80 to 90 per cent. Presumably because of the presence of small amounts of dichlor and tetrachlor products, the distillate cools to a non-crystalline, resinous solid at room temperature having the following characteristics.

| | |
|---|---|
| Color | light yellow |
| Flow point | 70 to 15° C. |
| Viscosity at 98.9° C. | 50 to 55 seconds Saybolt Universal |
| Specific gravity at 100° C. | 1.555 to 1.565 |

The distillation product may be refined by contact with a suitable absorbent, such as fuller's earth, preferably at 100° C. The product after filtration has the following average properties.

| | |
|---|---|
| Color | light yellow |
| Flow point | 70 to 75° C. |
| Viscosity | 54 seconds Saybolt Universal at 98.9° C. |
| Specific gravity (100° C.) | 1.562 |
| Reaction (neutralization number) | 0 (neutral) |
| Condition at 25° C. | non-crystalline, resinous solid |
| Dielectric constant at 25° C. | 8.0 |
| Power factor at 60 cycles 25° C. | .13 per cent |
| Resistivity at 25° C. | $29 \times 10^{12}$ ohms/cm. |

Because of its non-crystalline condition, this composition is well adapted for the impregnation of high voltage capacitors even without the addition of modifying ingredients.

For the purification of some chlorinated products, a solution process is preferable. The chlorinated product is dissolved in a suitable solvent, such as carbon tetrachloride or trichlorbenzene. The solution is filtered free from the suspended catalyst if the catalyst is insoluble in the solvent which is employed. The solution is washed with water and, if somewhat acid, is washed with dilute sodium hydroxide (3 to 5 per cent solution) and is again washed with water to remove traces of the hydroxide. Purification by distillation may be practised. Some decomposition may occur of the product being distilled. In that case, the distillate should be purified and neutralized by washing with 3 to 5 per cent solution of sodium hydroxide and dried by heating under reduced pressure.

Trichlor alpha nitronaphthalene can be associated advantageously with chlorinated diphenyl or equivalent halogenated polyphenyl compound. By the term "polyphenyl compound" I mean to include various equivalents of diphenyl, for example, diphenyl oxide, diphenyl methane, diphenyl ketone, diphenyl benzene, and the like. While chlorine ordinarily is employed as the preferred halogen, other halogens, notably fluorine, may be employed within the scope of my invention.

A capacitor treated with a composition containing 75 parts of pentachlor diphenyl and 25 parts of trichlor alpha nitronaphthalene operates with a 7.5 per cent higher capacity at 100° than a similar capacitor treated with pentachlor diphenyl unassociated with a modifying ingredient.

Compositions containing up to about 60 per cent of said trichlor nitro-naphthalene product, the remainder consisting of pentachlor diphenyl, not only result in a markedly higher capacity when used as impregnants for paper-spaced capacitors than does such pentachlor diphenyl unassociated with the naphthalene compound, but other advantages accrue. Capacitors when impregnated with approximately 90 parts pentachlor diphenyl associated with approximately 10 parts of trichlor αnitronaphthalene are characterized by a constant electrical capacity over a temperature range from about 25 to 100° C. Compositions consisting by weight of 75 to 90 parts of pentachlor diphenyl and 25 to 10 parts of trichlor alpha nitronaphthalene are liquid at room temperature, which is advantageous in the dielectric field. The most desirable proportion of the chlorinated nitro-naphthalene in a dielectric composition depends on the type of capacitor tissue, clamping pressure, etc., employed in the capacitor. In the results to be given, the impregnated capacitors consisted of aluminum armatures separated by spacers of kraft capacitor paper. The latter has a thickness of .0004 inch. This thickness is not critical but has been chosen as representing a prevalent commercial thickness. Such a capacitor is shown in Fig. 1, armatures being represented by the strips 2, 3. Two groups 4, 5 of paper spacers are illustrated. The enclosing case is not shown. Electrical connection is made to the armatures by the tap straps 6, 7. The improved characteristics are indicated by graphs which will be presently explained.

In the graph shown in Fig. 2, the abscissa represent a range of percentages, of the trichlor naphthalene compound, $\alpha NO_2C_{10}H_4Cl_3$, in admixture of said compound with pentachlor diphenyl and the ordinates indicate in per cent a relative increase or decrease of capacity as compared with a similar capacitor impregnated only with pentachlor diphenyl. The graph 8 here shown represents results taken at 100° C. capacitor temperature. It will be observed that although an increase of capacity occurs when even small additions of the naphthalene compound are present, the capacity rises to a maximum when the percentage of the naphthalene compound is between about 30 to 40 per cent.

As shown in Fig. 3, the dielectric constant of the compositions of pentachlor diphenyl and trichlor αnitronaphthalene reaches a maximum at about 15 per cent of the latter ingredient and begins to decrease when the proportion of the nitronaphthalene exceeds about 25 per cent. The graph 9, which represents the dielectric constant, rises at 25° C. to approximately 6.75 and at 100° C. rises to approximately 5.8 before decreasing.

When capacitors impregnated with compositions embodying my invention are to be used under such conditions or in such circuits that the variation of capacity would produce an undesirable effect, then the naphthalene compound should be restricted to a range of about 10 to 20 per cent. As shown in the graph 11 of Fig. 4, there is no change in capacity over a range of temperature from about 25 to 100° C. when the percentage of $\alpha C_{10}H_4Cl_3NO_2$ in the mixture is about 10 per cent. The graph 11 crosses the zero line when 10 per cent of the latter nitrochlor compound is present in the mixture.

While I have illustrated my invention with particular reference to compositions of chlorinated alpha nitro-naphthalene and pentachlor diphenyl, it is not restricted to such examples. Other chlorinated polyphenyl compounds can be similarly associated with the chlor alpha nitronaphthalene. For example, dielectric blends of trichlor alpha nitronaphthalene and tetrachlor diphenyl have advantageous dielectric properties. Fig. 5 of the drawing, the graph 12, illustrates the very slight changes in capacity of a capacitor containing such blend over the temperature range 25 to 100° C. When impregnated with a dielectric composition made up of about 15 per cent of trichlor alpha nitronaphthalene and 85 per cent tetrachlor diphenyl, a substantially constant capacity results over this range. For many applications, especially in radio circuits, such constant capacity feature is of particular value.

The most advantageous compositions will vary in the ratio of components depending on the particular components chosen. For example, to secure constancy of capacity in a composition containing pentachlor diphenyl, 10 per cent of the nitrochlor compound is required, whereas in a composition comprising tetrachlor diphenyl 15 per cent of the nitrochlor compound is required.

I also have found very small amounts of the chlorinated alpha nitronaphthalene when associated with other dielectric material to be useful as a stabilizer, particularly for high temperature operation. When capacitors impregnated with chlor diphenyl, chlor diphenyl oxide or chlorinated diphenyl methane are placed on direct current voltage at a stress in the range of 500 to 1000 volts per mil (which is used in many commercial applications), the capacitor is characterized by an unsatisfactory short life at temperatures of the order of 90° C. and higher. For practical purposes, as for example in the case of many filter or blocking capacitors, operating temperatures in the range of 90° C. and higher—even to 110° C., are encountered. The failure of ordinary chlorinated polyphenyl capacitors in this temperature range is accompanied by the etching and corrosion of the foil. When, however, from ½ to 5 per cent of the chlorinated alpha nitro-naphthalene is present, this foil corrosion is substantially eliminated with resulting dielectric stabilization of the capacity and a commercially satisfactory length of life.

Capacitors impregnated with a composition including about 99 parts of pentachlor diphenyl and 1 part of trichlor alpha nitro naphthalene are characterized by a power factor at 25° C. in the range of .30 to .35 per cent, and a direct current resistance value at least as high as 6000 megohm-microfarads. Capacitors impregnated with a dielectric composition consisting of 95 parts of pentachlor diphenyl and 5 parts of trichlor alpha nitronaphthalene similarly possess advantageous electrical characteristics. Capacitors impregnated with either impregnant function satisfactorily on direct current voltage under stresses as high as 1000 volts per mil without dangerous loss in resistance or increase in power factor.

What I claim as new and desire to secure by Letters Patent of the United States is:

1. A non-crystalline, light yellow, resinous material composed essentially of trichlor alpha nitronaphthalene, said material having a flow point of about 70 to 75° C., a dielectric constant of about 8, a power factor at 60 cycles, 25° C. of about .13 per cent and a resistivity at said temperature of $29 \times 10^{12}$ ohms per centimeter cube.

2. A composition of matter consisting essentially of chlorinated diphenyl and trichlor alpha nitronaphthalene, the latter ingredient being present in the range of about 10 to 40 per cent.

3. A dielectric material consisting by weight of about 75 to 90 per cent of pentachlor diphenyl and about 25 to 10 per cent of trichlor alpha nitronaphthalene.

4. A dielectric material which is suitable for capacitor impregnation consisting by weight of about one to 60 per cent by weight of trichlor alpha nitronaphthalene and about 99 to 40 per cent of pentachlor diphenyl.

5. A liquid dielectric material which is suitable for capacitor impregnation consisting by weight of about 90 to 75 parts of pentachlor diphenyl and about 10 to 25 parts of trichlor alpha nitronaphthalene.

6. A liquid dielectric material which is suitable for capacitor impregnation consisting by weight of 85 parts of pentachlor diphenyl and 15 parts of trichlor alpha nitronaphthalene.

7. A liquid dielectric material which is suitable for capacitor impregnation consisting mainly of a chlorinated polyphenyl compound which is admixed with at least about one-half of one per cent of trichlor alpha nitronaphthalene.

8. A non-crystalline, resinous material having a flow point of about 70 to 75° C. composed essentially of trichlor alpha nitronaphthalene and containing as impurities amounts of dichlor and tetrachlor alpha nitronaphthalene which are insufficient to cause the boiling point of the composition to depart from a normal range of about 230 to 280° C. at a pressure of 15 mm. of mercury.

FRANK M. CLARK.